United States Patent [19]

Berneburg et al.

[11] Patent Number: 4,552,786
[45] Date of Patent: Nov. 12, 1985

[54] METHOD FOR DENSIFICATION OF CERAMIC MATERIALS

[75] Inventors: Philip L. Berneburg, Forest, Va.; Val J. Krukonis, Lexington, Mass.

[73] Assignee: The Babcock & Wilcox Company, New Orleans, La.

[21] Appl. No.: 659,139

[22] Filed: Oct. 9, 1984

[51] Int. Cl.$^4$ .............................................. C23C 11/00
[52] U.S. Cl. .................................. 427/249; 427/248.1; 427/255; 427/255.1; 427/255.5
[58] Field of Search ...................... 427/255, 248.1, 249, 427/255.1, 255.5

[56] References Cited

U.S. PATENT DOCUMENTS

| | | | |
|---|---|---|---|
| 4,241,112 | 12/1980 | Kostandov et al. | 427/213 |
| 4,330,573 | 5/1982 | Kostandov et al. | 427/213 |
| 4,426,405 | 1/1984 | Hierholzer et al. | 427/255 X |

OTHER PUBLICATIONS

Chemical Abstracts 101(2):11,383g.
Chemical Abstracts 101(14):115,528z.
Chemical Abstracts 101(24):215,342c.
Chemical Abstracts 101(26):234,451d.

*Primary Examiner*—Thurman K. Page
*Attorney, Agent, or Firm*—Robert J. Edwards; Mark B. Quatt

[57] ABSTRACT

Supercritical fluids may be used to carry ceramic precursor materials into the pores of a ceramic host. Reducing the solubility of the ceramic precursor in the supercritical fluid will cause deposition of the ceramic precursor in the pores or void spaces of the ceramic host and accomplish densification of the ceramic host material.

10 Claims, No Drawings

METHOD FOR DENSIFICATION OF CERAMIC MATERIALS

BACKGROUND

1. Field of the Invention

The present invention relates to ceramic materials, and more particularly densified ceramic materials and a method of producing them.

Impregnation of low density ceramic bodies to complete densification is typically accomplished by immersing a ceramic part in a bath of a chemical solution, slurry, or melt, often under vacuum to assist the removal of trapped air. Multiple immersions are commonly necessary to achieve sufficient penetration and densification. With these conventional impregnation techniques, elimination of the final, few percent porosity is extremely difficult or impossible because of the sealing-off of passageways to the interior of the ceramic body during the impregnation process. Sufficient densification may also be difficult due to the high viscosities of some impregnants or large slurry particle sizes relative to the available openings in the ceramic body.

2. Description of the Prior Art

Supercritical fluids are dense gases and liquids at conditions above their respective thermodynamic critical points. They exhibit a number of unique properties which form the basis for their usefulness as processing tools. They exhibit high solvent power for many normally insoluble substances, pressure dependent solvent power, near ambient temperature processing capability, low viscosity and high diffusivity, and the absence of surface tension. For any particular supercritical fluid, at sufficiently high pressure the isobaric solubility of a material increases as a function of temperature. At lower pressures, the solubility of a dissolved material is inversely related to temperature. At a given temperature (above the critical temperature of the fluid) a decrease in pressure reduces the solubility of the dissolved material in the fluid.

Supercritical fluids have been used for the recovery of certain materials from foodstuffs and other starting materials. U.S. Pat. No. 3,806,619 (Zosel) for example discloses the use of supercritical carbon dioxide for recovery of caffeine. U.S. Pat. No. 4,104,409 (Vitzhum et al.) describes the removal of certain resins from hops using supercritical carbon dioxide and other compounds. U.S. Pat. No. 4,167,589 (Vitzhum et al.) shows the impregnation of dearomatized, decaffeinated tea using supercritical fluids such as carbon dioxide. U.S. Pat. No. 4,354,922 (Derbyshire et al.) shows a dense gas solvent, in a supercritical fluid state above its critical temperature and pressure, used to extract heavy hydrocarbon oil constituents. The reference teaches that the pressure is lowered (while maintaining the temperature above the critical temperature), or the temperature is raised, to precipitate out the dissolved hydrocarbon constituents. It has thus been demonstrated that supercritical fluids are applicable for extracting normally insoluble materials and removing them from a base material. Vitzhum et al. U.S. Pat. No. 4,167,589 also teaches that supercritical carbon dioxide can absorb certain aromatic consituents of tea, and upon subsequent dissociation can redeposit these aromatics in the tea. U.S. Pat. No. 4,241,112 (Kostandov et al.) discloses the successive deposition of an organometallic catalyst on the surface of a solid filler. The deposition of the second component of the catalyst is gas or liquid phase deposition, and a simultaneous polymerization of olefins on a first deposited catalyst component is carried out at temperatures which in some cases fall within the supercritical regime.

While supercritical fluid technology has thus been demonstrated to be useful particularly in the removal of certain components by dissolution relating to foodstuffs, and deposition of an organometallic catalyst or redeposition of aromatics, none of the references have applied this technology to the specific densification of porous ceramic structures. It has been discovered that the highly permeative nature of supercritical fluids allows for much easier infiltration (penetration) of smaller openings in ceramic material and can thus improve the densification of ceramic bodies.

SUMMARY OF THE INVENTION

A process for increasing the density of low density ceramic material comprises dissolving a ceramic precursor in a supercritical fluid; infiltrating (i.e. penetrating) the low density ceramic material with the ceramic precursor-laden fluid; and reducing the solubility of the ceramic precursor in the fluid to impregnate (i.e. deposit) the ceramic precursor in void spaces of the ceramic material.

DESCRIPTION OF THE PREFERRED EMBODIMENTS

Supercritical fluids exhibit a number of characteristics which are of great potential utility in the processing of ceramic materials. It is well known that at temperatures and pressures above their respective thermodynamic critical points, dense gases posses unusually high solvent power for many, normally difficultly-soluble materials. Moreover, it has been observed that the solubility of these materials in supercritical gases is highly pressure dependent. In addition to the ability to dissolve high molecular weight compounds, polymers and other materials, supercritical fluids possess favorable transport properties such as low viscosity and high diffusivity. Furthermore, the absence of surface tension improves the penetration of the fluid into submicron sized pores.

In accordance with the invention it has been found that several nonoxide and oxide ceramic precursor materials are soluble in supercritical fluids. The solubility of these precursor materials may be controllably varied and thus allow for fractionation of several polysilane and polycarbosilane polymers. Silicon-containing polymeric materials which act as silicon carbide or silicon nitride precursors are therefore suitable for use in the present invention. Such materials include for example polycarbosilane and polycarbosilazane. In accordance with the invention and the examples given below, it has also been found that infiltration of a porous ceramic body by a supercritical fluid containing a dissolved ceramic precursor, and internal deposition of the precursor within monolithic and fibrous ceramic bodies is possible.

Test results demonstrating illustrative examples of the invention are summarized in Table I below and described further in the following examples.

TABLE 1

SUPERCRITICAL FLUID IMPREGNATION TESTS

| Test No. | Host Matrix | Impregnant | Recorded Weight Gains |
|---|---|---|---|
| 1 | "Saffil" (Al$_2$O$_3$)/RSSN (37% dense) | UCC Polysilane | 19% 28% |
| 2 | "Nicalon" SiC Fabric | Al isopropoxide | — |
| 3 | "Crystar" CS-101 SiC (80% dense) | Al isopropoxide | 1% 1% |
| 4 | "Nextel" braided sleeving (Al borosilicate) | UCC Polysilane | 31% ($\frac{1}{4}$" sleeving) 43% ($\frac{1}{2}$" sleeving) |

EXAMPLE 1

A porous reaction sintered silicon nitride material containing reinforcing alumina fibers was made in the form of small bars approximately ¼ inch square by 1 inch long. These ceramic bodies consisted of alumina fibers in a porous matrix of irregular shaped grains of silicon nitride with fine silicon nitride whiskers. The ceramic precursor used in this test was a polysilane obtained from Union Carbide Corporation. This ceramic precursor was dissolved in propane in a supercritical state. The precursor-laden propane was then infiltrated into the reaction sintered silicon nitride material and the solubility of the polysilane in the supercritical fluid was then reduced to cause deposition of the polysilane in the ceramic body. Scanning electron micrographs demonstrated the deposition of the polysilane as a smooth-surfaced film on the alumina fibers and fine silicon nitride whiskers.

EXAMPLE 2

A strip of woven Nippon Carbon Company "Nicalon" silicon carbide fiber was chosen as a ceramic host material. This strip was rolled into a small cylinder to accommodate the dimensions of the experimental apparatus used. Aluminum isopropoxide was selected as the ceramic precursor material for alumina. The aluminum isopropoxide was dissolved in supercritical propane and the precursor-laden supercritical propane was infiltrated into the silicon carbide cloth strip. Scanning electron microscope examination of fiber bundles taken from the impregnated sample showed that the fiber bundles had been penetrated and that the individual fibers had been coated with aluminum isopropoxide. In this particular test, no precautions were taken for controlled hydrolysis of the aluminum isopropoxide in the ceramic host material after impregnation. Therefore the aluminum isopropoxide was hydrolyzed by exposure to ambient air, and drying and shrinkage cracks were seen on the coatings of the fibers resulting from this uncontrolled hydration.

EXAMPLE 3

A silicon carbide material of approximately 80% density was selected. The specific material comprised two samples of "Crystar" silicon carbide produced by Norton Company and designated CS-101. These samples were in the form of ring segments approximately ¼ inch square by one inch long. Aluminum isopropoxide was chosen as the ceramic precursor material. The precursor material was dissolved in propane in a supercritical state and the precursor-laden propane was then infiltrated into the silicon carbide host material. The aluminum isopropoxide, a non-silicon carbide precursor, was chosen in order to have a chemical distinction between the host material and the impregnant material which could be used to more positively identify the deposited material after impregnation.

The CS-101 silicon carbide consisted of a microstructure of a continuous matrix of large silicon carbide grains together at their contact points. The matrix thus formed a continuous porous network. The walls of these pores were generally rounded in contour with smooth featureless surfaces. After the impregnation step was performed, subsequent scanning electron microscope examination of a transverse fracture surface of the impregnated host material showed that a coating had been deposited on the walls of all the interconnected internal pores. In some cases, the deposited material filled these pores. As in Example 2 above, dehydration cracks were also observed. In order to confirm the identity of the coatings and pore fillings, X-ray microanalyses were performed on a scanning electron microscope at several locations in the host material. These X-ray microanalyses indicated the presence of silicon in the matrix and the presence of aluminum in the deposited material. It was observed that the appearance of the deposited material on the pore walls was fairly uniform regardless of the distance from the outer edges of the host sample. It has thus been demonstrated that impregnation of a porous ceramic material can be accomplished in a uniform manner throughout the cross section of the host material without the problems of surface plugging and sealing-off of pores near the surface of the host material. In this example, internal pore openings as small as 10 microns were penetrated by the supercritical fluid-carried aluminum isopropoxide.

EXAMPLE 4

Two samples of "Nextel" aluminum borosilicate sleeving manufactured by Minnesota Mining and Manufacturing Co. were used as the ceramic host material. This braided sleeving was used in two short lengths; a piece of ¼ inch inside diameter sleeving was placed completely inside a piece of ½ inch inside diameter sleeving, in order to demonstrate through a particularly rigorous test the ability of supercritical fluids to penetrate tight fiber bundles.

A polysilane obtained from Union Carbide Corporation was used as the ceramic precursor material. This impregnant was dissolved in supercritical propane and the precursor-laden fluid was infiltrated into the aluminum borosilicate sleeving. Scanning electron microscopic examination of fiber bundles taken from the sleeving after impregnation showed that the polysilane had penetrated and completely filled the individual fiber bundles of both the outer and inner sleeves. In this particular test, the polysilane polymer exhibited a high solubility at the somewhat arbitrary conditions chosen for the test, and therefore a substantial amount of polysilane was deposited in the fiber bundles.

The recorded weight gains listed in Table I demonstrate the deposition of ceramic precursor materials in ceramic host materials in accordance with the practice of this invention. To obtain optimum densification of ceramic materials, knowledge of the solubility and the change in solubility of the ceramic precursor material in various supercritical fluids with changes in operating parameters must be known.

It should be noted that in the examples given above, combinations of ceramic host materials and ceramic precursor materials were chosen which would allow for more positive identification of the deposited material after impregnation, and therefore demonstrate the degree of densification attainable by the practice of the invention. For example, in Example 3 aluminum isopropoxide, a non-silicon carbide precursor, was used to infiltrate and impregnate a silicon carbide host material. In fact, silicon carbide precursor materials, such as polysilane, would be more suitable in densifying a silicon carbide host material or any silicon-bearing host material.

Likewise, Example 4 shows polysilane used to infiltrate an aluminum borosilicate material. In this case, aluminum isopropoxide would be a more suitable ceramic precursor for densifying an aluminum-bearing host material.

After infiltration and impregnation of the ceramic precursor, the ceramic material is subjected to further processing, well known in the art, for converting the deposited precursor to final form. Normally, depending on the nature of the precursor material, a particular process cycle is employed.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

The embodiments of the invention in which an exclusive property or privilege is claimed are defined as follows:

1. A process for increasing the density of a ceramic material which comprises:
   a. dissolving a ceramic precursor in a supercritical fluid;
   b. infiltrating the ceramic material with the ceramic precursor-laden fluid; and
   c. reducing the solubility of the ceramic precursor in the fluid to deposit the ceramic precursor in void spaces of the ceramic material.

2. A process according to claim 1 wherein the supercritical fluid is one selected from the group consisting of methane, ethylene, carbon dioxide, ethane, nitrous oxide, propane, butane, and chloro-, fluoro-, and chloro fluoro-hydrocarbons.

3. A process for increasing the density of a silicon nitride material which comprises:
   a. dissolving a ceramic precursor in a supercritical fluid;
   b. infiltrating the silicon nitride material with the ceramic precursor-laden fluid; and
   c. reducing the solubility of the ceramic precursor in the fluid to deposit the ceramic precursor in void spaces of the silicon nitride material.

4. A process according to claim 3 wherein the silicon nitride is a porous reaction sintered silicon nitride.

5. A process according to claim 3 wherein the ceramic precursor is a silicon-containing polymeric material which acts as a silicon nitride precursor.

6. A process for increasing the density of a silicon carbide material which comprises:
   a. dissolving a ceramic precursor in a supercritical fluid;
   b. infiltrating the silicon carbide material with the ceramic precursor-laden fluid; and
   c. reducing the solubility of the ceramic precursor in the supercritical fluid to deposit the ceramic precursor in void spaces of the silicon carbide material.

7. A process according to claim 6 wherein the ceramic precursor is a silicon-containing polymeric material which acts as a silicon carbide precursor.

8. A process according to claim 6 wherein the silicon-containing polymeric material which acts as a silicon carbide precursor is polysilane.

9. A process for increasing the density of an aluminum borosilicate material which comprises:
   a. dissolving a ceramic precursor in a supercritical fluid;
   b. infiltrating the aluminum borosilicate material with the ceramic precursor-laden fluid; and
   c. reducing the solubility of the ceramic precursor in the supercritical fluid to deposit the ceramic precursor in void spaces of the aluminum borosilicate material.

10. A process according to claim 7 wherein the ceramic precursor is aluminum isopropoxide.

* * * * *